United States Patent
Yan et al.

(10) Patent No.: US 12,289,142 B2
(45) Date of Patent: Apr. 29, 2025

(54) COMMUNICATION METHOD AND APPARATUS

(71) Applicant: HUAWEI TECHNOLOGIES CO., LTD., Guangdong (CN)

(72) Inventors: Mao Yan, Chengdu (CN); Kuandong Gao, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/298,397

(22) Filed: Apr. 11, 2023

(65) Prior Publication Data
US 2023/0246675 A1    Aug. 3, 2023

Related U.S. Application Data

(63) Continuation of application No. PCT/CN2020/124027, filed on Oct. 27, 2020.

(51) Int. Cl.
H04B 7/04 (2017.01)
H04B 7/06 (2006.01)

(52) U.S. Cl.
CPC ....... H04B 7/04013 (2023.05); H04B 7/0632 (2013.01)

(58) Field of Classification Search
CPC ........... H04L 27/2634; H04L 25/03993; H04L 27/2666; H04L 27/2672; H04L 27/2675; H04L 27/2663; H04W 74/0833
See application file for complete search history.

(56) References Cited

U.S. PATENT DOCUMENTS

| | | | | |
|---|---|---|---|---|
| 2012/0170481 A1* | 7/2012 | Kimura | ............. | H04B 7/15542 370/252 |
| 2019/0239284 A1* | 8/2019 | Xu | ......... | H04W 72/51 |
| 2022/0141058 A1* | 5/2022 | Liu | ........ | H04W 72/20 370/329 |
| 2022/0393756 A1* | 12/2022 | Matsumura | ........ | H04B 7/15514 |

FOREIGN PATENT DOCUMENTS

| | | |
|---|---|---|
| EP | 2884791 A1 | 6/2015 |
| WO | 2021031919 A1 | 2/2021 |

OTHER PUBLICATIONS

Wu Qingqing et al: "Intelligent Reflecting Surface-Aided Wireless Communications: A Tutorial", Jul. 7, 2020, pp. 3313-3351, XP055915743.

Xiaojun Yuan et al: "Reconfigurable-Intelligent-Surface Empowered 6G Wireless Communications: Challenges and Opportunities", Jan. 2, 2020, XP081570633, total 7 pages.

* cited by examiner

*Primary Examiner* — Jean B Corrielus

(57) ABSTRACT

This disclosure discloses a communication method and apparatus. In the method, a reflector is used to assist in communication between a terminal and an access network device, and in a reflector-assisted communication process, the reflector is indicated to be in a working mode when being required by the terminal or the access network device, to assist in communication, and the reflector is indicated to be in a sleep mode when being required by the terminal or the access network device, to reduce power consumption.

20 Claims, 9 Drawing Sheets

COMMUNICATION METHOD AND APPARATUS

CROSS-REFERENCE TO RELATED APPLICATIONS

This disclosure is a continuation of International Application No. PCT/CN2020/124027, filed on Oct. 27, 2020, the disclosure of which is hereby incorporated by reference in its entirety.

TECHNICAL FIELD

This disclosure relates to the field of communication technologies, and in particular, to a communication method and apparatus.

BACKGROUND

An existing typical cellular communication structure is shown in FIG. 1. A base station directly communicates with a terminal, and both the base station and the terminal may use beamforming, so that signal energy is concentrated in a beam direction, and therefore transmission performance is improved. Although signal transmission performance can be improved through beamforming, an optimal effect cannot be obtained due to a limitation of a spatial channel. Particularly, for non-line-of-sight transmission, a wireless communication signal is usually severely attenuated by a scatterer or an obstacle in an environment. Even if a high-gain beam is used, good communication performance cannot be obtained.

In addition, the base station may alternatively communicate with the terminal through a repeater, which can effectively expand a signal. Existing repeaters are usually classified into two types: an amplification and forwarding relay, and a decoding and forwarding relay. The amplification and forwarding relay processes a received signal through a radio frequency circuit, and then amplifies and transmits the signal. The decoding and forwarding relay decodes a received signal, re-codes the signal, and then forwards data after performing a series of signal processing, to implement communication between the base station and the terminal. Time and frequency resources for the repeater to work are generally scheduled by the base station. Although the repeater can extend a coverage area, the repeater has a high requirement on signal processing. Therefore, power consumption is high, deployment is difficult, and a delay in signal processing may be prolonged.

Consequently, a communication manner is urgently required to overcome the foregoing problem and ensure normal communication between the terminal and an access network device.

SUMMARY

This disclosure provides a communication method and apparatus, to provide a communication manner, so as to effectively assist in communication between a terminal and an access network device.

According to a first aspect, an embodiment of this disclosure provides a communication method. The method may be performed by a first communication apparatus. The first communication apparatus may be a reflector, or a communication apparatus, for example, a component included in the reflector, or a chip system in the reflector, that can support the reflector in implementing a function required by the method. For example, the method is performed by the reflector. The method includes the following steps:

The reflector receives first indication information. The first indication information indicates the reflector to start a working mode. The reflector receives second indication information. The second indication information indicates a communication resource occupied by the reflector in the working mode. The communication resource includes at least one of a time domain resource, a frequency domain resource, or a code domain resource. It should be noted that the first indication information and the second indication information may come from a same message, or may come from different messages. Then, the reflector sends a reflected signal to an access network device or a terminal device on the communication resource.

In this embodiment of this disclosure, the terminal device indicates the reflector to start assisted communication only when assistance is required, and the reflector starts to reflect a signal only when receiving the first indication information. On the contrary, the reflector does not reflect a signal. This helps reduce power consumption of the reflector.

In a possible design, the second indication information further includes an identifier of the reflector. That the reflector sends a reflected signal to an access network device or a terminal device on the communication resource includes:

The reflector sends the reflected signal to the access network device or the terminal device on the communication resource when determining that the second indication information includes the identifier of the reflector. On the contrary, the reflector does not send the reflected signal to the access network device or the terminal device when determining that the second indication information does not include the identifier of the reflector.

In this embodiment of this disclosure, when a plurality of reflector devices exist around the terminal device, a reflector that needs to be used may be selected in the foregoing manner, to trigger the reflector to start reflection, and another reflector around the terminal device does not start reflection. This helps further reduce the power consumption of the reflector.

In a possible design, the second indication information further includes a reflection state matrix index, each index in the reflection state matrix index corresponds to one reflection state matrix, and a reflection state matrix refers to a correspondence between a reflection array element of the reflector and a status of the reflection array element. That the reflector sends a reflected signal to an access network device or a terminal device on the communication resource includes:

The reflector sends the reflected signal to the access network device or the terminal device on the communication resource based on the reflection state matrix index. In other words, the reflector reflects a signal by using a reflection state matrix indicated by the second indication information.

In this embodiment of this disclosure, the reflection state matrix index is carried in the second indication information, which helps the reflector determine, based on the index, a reflection array element that needs to start reflection. Because the reflection state matrix index occupies a small bit, system overheads of a communication system are reduced.

In a possible design, the reflector receives third indication information. The third indication information indicates the reflector to start a sleep mode. The reflector stops sending the reflected signal to the access network device or the terminal device.

In this embodiment of this disclosure, when the terminal does not need assistance, the terminal indicates the reflector to stop working. Therefore, the power consumption can be reduced.

According to a second aspect, an embodiment of this disclosure further provides a communication method, which may be applied to a second communication apparatus. The second communication apparatus may be a terminal device, or a communication apparatus, for example, a component included in the terminal device, or a chip system in the terminal device, that can support the terminal device in implementing a function required by the method. For example, the method may be performed by the terminal device. The method includes:

The terminal device receives reflector scheduling information from an access network device. The reflector scheduling information includes a communication resource occupied by a reflector in a working mode.

The terminal device sends first indication information to the reflector. The first indication information indicates the reflector to start the working mode.

The terminal device or the access network device sends second indication information to the reflector. The second indication information indicates the communication resource.

The terminal device communicates with the access network device on the communication resource through assisted communication of the reflector when the reflector starts the working mode.

In this embodiment of this disclosure, the terminal device indicates the reflector to start the assisted communication only when assistance is required, and the reflector starts to reflect a signal only when receiving the first indication information. On the contrary, the reflector does not reflect a signal. This helps reduce power consumption of the reflector.

In a possible design, that the terminal device sends first indication information to the reflector includes:

The terminal device sends the first indication information to the reflector when determining that at least one of trigger conditions for starting the working mode is met.

The trigger conditions for starting the working mode include at least one of the following:

Measured signal quality of a downlink signal sent by the access network device is less than a first signal quality threshold.

A specified downlink signal is received.

It is determined that quality of service of a currently executed service does not meet a first specified service requirement.

In this embodiment of this disclosure, the terminal device may determine, through the foregoing determining, when the assisted communication of the reflector is required, and therefore indicate the reflector to start the assisted communication only when determining that the assisted communication is required. This helps reduce the power consumption of the reflector.

In a possible design, that the terminal device sends first indication information to the reflector includes:

The terminal device sends the first indication information to the reflector on a physical random access channel resource associated with the specified downlink signal.

In this embodiment of this disclosure, the physical random access channel resource associated with the specified downlink signal is selected to send the indication information, so that system overheads of a communication system can be reduced.

In a possible design, the second indication information further includes at least one of a reflection state matrix index, a working frequency of the reflector, or an identifier of the reflector.

In a possible design, the method further includes: The terminal device sends third indication information to the reflector when determining that at least one of trigger conditions for starting a sleep mode is met. The third indication information indicates to start the sleep mode.

The trigger conditions for starting the sleep mode include at least one of the following:

Measured signal quality of a downlink signal sent by the access network device is greater than a second signal quality threshold.

It is determined that quality of service of a currently executed service meets a second specified service requirement.

In this embodiment of this disclosure, when the terminal does not need assistance, the terminal indicates the reflector to stop working. Therefore, the power consumption can be reduced.

According to a third aspect, an embodiment of this disclosure further provides a communication method. The method may be applied to a third communication apparatus. The third communication apparatus may be an access network device, or a communication apparatus, for example, a component included in the access network device, or a chip system in the access network device, that can support the access network device in implementing a function required by the method. For example, the method may be performed by the access network device. The method includes:

The access network device sends reflector scheduling information to a reflector. The reflector scheduling information includes a communication resource occupied by the reflector in a working mode. The access network device receives a reflected signal sent by the reflector on the communication resource.

In this embodiment of this disclosure, when the reflector receives the reflector scheduling information, it is proved that a terminal device needs assisted communication. Therefore, the reflector is enabled to perform reflection, so that power consumption can be reduced to some extent.

In a possible design, before the access network device sends a reflected signal to the reflector, the method further includes:

The access network device receives a first request message from a terminal device. The first request message requests to enable reflection surface-assisted communication. The access network device sends a first indication to the reflector. The first indication indicates the reflector to start the working mode.

In this embodiment of this disclosure, when the reflector receives the reflector scheduling information and the first indication, it is proved that the terminal device needs the assisted communication. Therefore, the reflector is enabled to perform reflection, so that the power consumption can be reduced to some extent.

In a possible design, the access network device receives a second request message from the terminal device. The second request message requests to stop the reflection surface-assisted communication.

The access network device sends a second indication to the reflector. The second indication indicates the reflector to start a sleep mode.

In a possible design, the reflector scheduling information further includes at least one of a reflection state matrix index, a frequency supported by the reflector, or an identifier of the reflector.

According to a fourth aspect, this disclosure provides a first communication apparatus. The apparatus may be a reflector, or may be a chip in the reflector. The apparatus has a function of implementing embodiments of the first aspect. The function may be implemented by hardware, or may be implemented by hardware executing corresponding software. The hardware or the software includes one or more modules corresponding to the function.

In a possible design, when the apparatus is the reflector, the reflector includes a transceiver unit, and optionally includes a processing unit. The processing unit may be, for example, a processor. A receiving unit may be, for example, a receiver. A sending unit may be, for example, a transmitter. The receiver and the transmitter include a radio frequency circuit. Optionally, the reflector further includes a storage unit, and the storage unit may be, for example, a memory. When the reflector includes the storage unit, the storage unit stores computer-executable instructions, the processing unit is connected to the storage unit, and the processing unit executes the computer-executable instructions stored in the storage unit, so that the reflector performs the method according to any one of implementations of the first aspect.

In another possible design, when the apparatus is the chip in the reflector, the chip includes a receiving unit and a sending unit, and optionally includes a processing unit. The processing unit may be, for example, a processing circuit. The receiving unit may be, for example, an input interface, a pin, a circuit, or the like. The sending unit may be, for example, an output interface, a pin, a circuit, or the like. The processing unit may execute computer-executable instructions stored in a storage unit, so that the method according to any one of implementations of the first aspect is performed. Optionally, the storage unit is a storage unit, for example, a register or a cache, in the chip. The storage unit may alternatively be a storage unit, for example, a read-only memory (read-only memory, ROM), another type of static storage device capable of storing static information and instructions, or a random access memory (random access memory, RAM), located outside the chip in the reflector.

The processor mentioned in any of the foregoing descriptions may be a general-purpose central processing unit (Central Processing Unit, CPU), a microprocessor, an application-specific integrated circuit (application-specific integrated circuit, ASIC), or one or more integrated circuits configured to control program execution of the method according to any one of implementations of the first aspect.

According to a fifth aspect, this disclosure provides a second communication apparatus. The apparatus may be a terminal device, or may be a chip in the terminal device. The apparatus has a function of implementing embodiments of the second aspect. The function may be implemented by hardware, or may be implemented by hardware executing corresponding software. The hardware or the software includes one or more modules corresponding to the function.

In a possible design, when the apparatus is the terminal device, the terminal device includes a transceiver unit, and optionally includes a processing unit. The processing unit may be, for example, a processor. A receiving unit may be, for example, a receiver. A sending unit may be, for example, a transmitter. The receiver and the transmitter include a radio frequency circuit. Optionally, the terminal device further includes a storage unit, and the storage unit may be, for example, a memory. When the terminal device includes the storage unit, the storage unit stores computer-executable instructions. The processing unit is connected to the storage unit. The processing unit executes the computer-executable instructions stored in the storage unit, to enable the terminal device to perform the method according to any one of implementations of the second aspect.

In another possible design, when the apparatus is the chip in the terminal device, the chip includes a receiving unit and a sending unit, and optionally includes a processing unit. The processing unit may be, for example, a processing circuit. The receiving unit may be, for example, an input interface, a pin, a circuit, or the like. The sending unit may be, for example, an output interface, a pin, a circuit, or the like. The processing unit may execute computer-executable instructions stored in a storage unit, so that the method according to any one of implementations of the second aspect is performed. Optionally, the storage unit is a storage unit, for example, a register or a cache, in the chip. The storage unit may alternatively be a storage unit, for example, a read-only memory (read-only memory, ROM), another type of static storage device capable of storing static information and instructions, or a random access memory (random access memory, RAM), located outside the chip in the terminal.

The processor mentioned in any of the foregoing descriptions may be a general-purpose central processing unit (Central Processing Unit, CPU), a microprocessor, an application-specific integrated circuit (application-specific integrated circuit, ASIC), or one or more integrated circuits configured to control program execution of the method according to any one of implementations of the second aspect.

According to a sixth aspect, this disclosure provides a third communication apparatus. The apparatus may be a reflector, or may be a chip in the reflector. The apparatus has a function of implementing embodiments of the third aspect. The function may be implemented by hardware, or may be implemented by hardware executing corresponding software. The hardware or the software includes one or more modules corresponding to the function.

In a possible design, when the apparatus is the reflector, the reflector includes a transceiver unit, and optionally includes a processing unit. The processing unit may be, for example, a processor. A receiving unit may be, for example, a receiver. A sending unit may be, for example, a transmitter. The receiver and the transmitter include a radio frequency circuit. Optionally, the reflector further includes a storage unit, and the storage unit may be, for example, a memory. When the reflector includes the storage unit, the storage unit stores computer-executable instructions, the processing unit is connected to the storage unit, and the processing unit executes the computer-executable instructions stored in the storage unit, so that the reflector performs the method according to any one of implementations of the third aspect.

In another possible design, when the apparatus is the chip in the reflector, the chip includes a receiving unit and a sending unit, and optionally includes a processing unit. The processing unit may be, for example, a processing circuit. The receiving unit may be, for example, an input interface, a pin, a circuit, or the like. The sending unit may be, for example, an output interface, a pin, a circuit, or the like. The processing unit may execute computer-executable instructions stored in a storage unit, so that the method according to any one of implementations of the third aspect is performed. Optionally, the storage unit is a storage unit, for example, a register or a cache, in the chip. The storage unit may alternatively be a storage unit, for example, a read-only memory (read-only memory, ROM), another type of static storage device capable of storing static information and instructions, or a random access memory (random access memory, RAM), located outside the chip in the reflector.

The processor mentioned in any of the foregoing descriptions may be a general-purpose central processing unit (Central Processing Unit, CPU), a microprocessor, an application-specific integrated circuit (application-specific integrated circuit, ASIC), or one or more integrated circuits configured to control program execution of the method according to any one of implementations of the third aspect.

According to a seventh aspect, this disclosure provides a communication system, including the first communication apparatus in any design example of the first aspect and the second communication apparatus in any design example of the third aspect. Optionally, the communication system further includes a network data analytics function (network data analytics function, NWDAF) network element.

According to an eighth aspect, an embodiment of this disclosure provides a chip system. The chip system includes a processor, and may further include a memory, and is configured to implement the method performed by the first communication apparatus in any design example of the first aspect, the second aspect, or the third aspect. The chip system may include a chip, or may include the chip and another discrete component.

According to a ninth aspect, an embodiment of this disclosure further provides a computer-readable storage medium. The computer-readable storage medium stores a computer program or instructions. When the computer program or the instructions are executed, the method performed by the first communication apparatus in any design example of the first aspect may be implemented.

According to a tenth aspect, an embodiment of this disclosure further provides a computer-readable storage medium. The computer-readable storage medium stores a computer program or instructions. When the computer program or the instructions are executed, the method performed by the second communication apparatus in any design example of the second aspect may be implemented.

According to an eleventh aspect, an embodiment of this disclosure further provides a computer-readable storage medium. The computer-readable storage medium stores a computer program or instructions. When the computer program or the instructions are executed, the method performed by the third communication apparatus in any design example of the third aspect may be implemented.

According to a twelfth aspect, an embodiment of this disclosure further provides a computer program product, including instructions. When the computer program product runs on a computer, the computer is enabled to perform the method performed by the first communication apparatus in any design example of the first aspect.

According to a thirteenth aspect, an embodiment of this disclosure further provides a computer program product, including instructions. When the computer program product runs on a computer, the computer is enabled to perform the method performed by the second communication apparatus in any design example of the second aspect.

According to a fourteenth aspect, an embodiment of this disclosure further provides a computer program product, including instructions. When the computer program product runs on a computer, the computer is enabled to perform the method performed by the third communication apparatus in any design example of the third aspect.

In addition, for technical effects brought by any design method in the fourth aspect to the fourteenth aspect, refer to the technical effects brought by different design manners of the first aspect to the third aspect. Details are not repeated herein again.

DESCRIPTION OF EMBODIMENTS

Embodiments of this disclosure may be applied to various mobile communication systems, for example, a new radio (new radio, NR) system, a long term evolution (long term evolution, LTE) system, a long term evolution (advanced long term evolution, LTE-A) advanced system, a universal mobile telecommunications system (universal mobile telecommunications system, UMTS), an evolved long term evolution (evolved long term evolution, eLTE) system, and another communication system such as a future communication system. This is not specifically limited herein. For example, an architecture of a communication system applied to embodiments of this disclosure may be shown in FIG. 2A, including a terminal device, a reflector, and an access network device.

Figure 1:
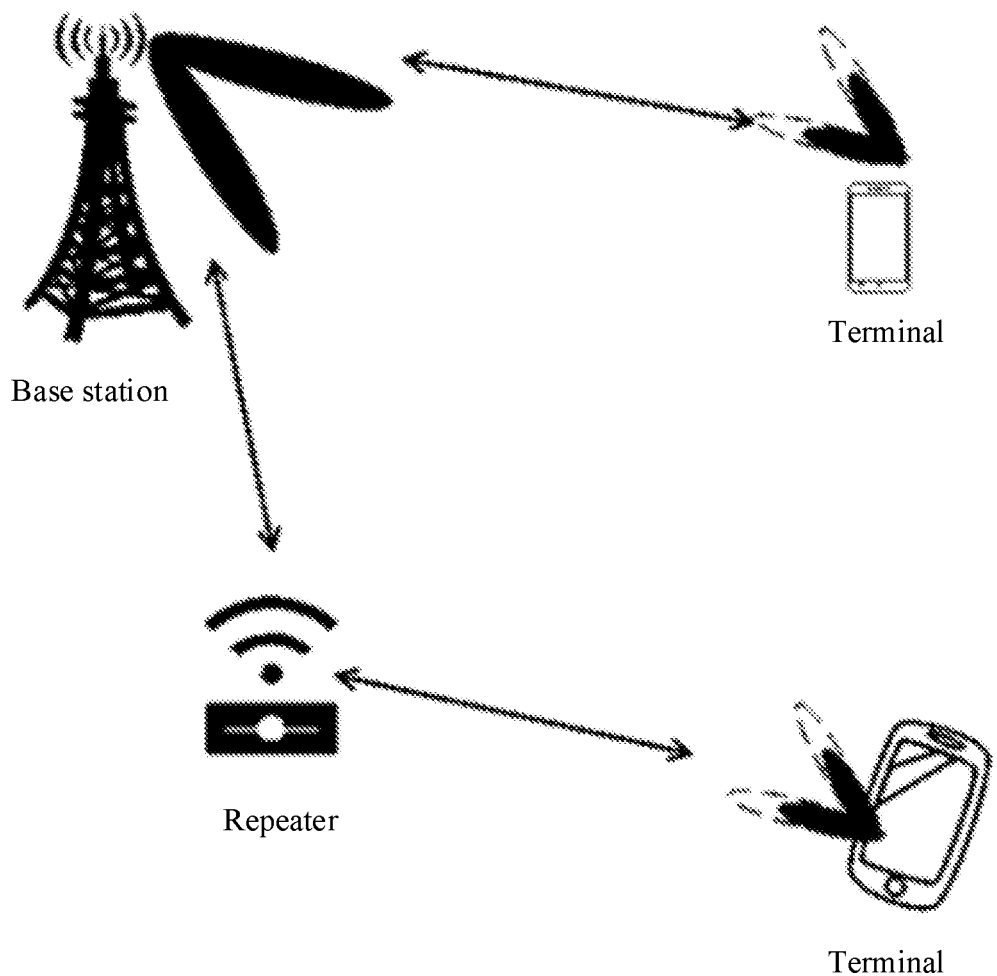
FIG. 1 is a schematic diagram of a cellular communication architecture.
Figure 2A:
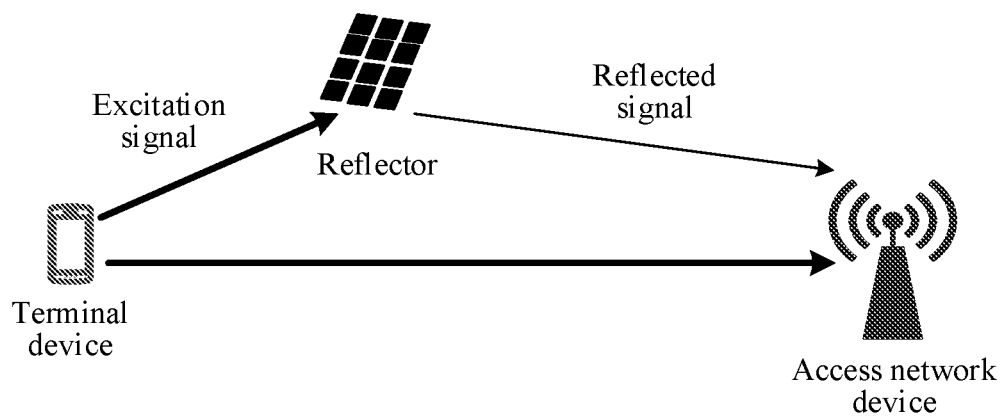
FIG. 2A is a schematic diagram of a communication architecture according to an embodiment of this disclosure.

In FIG. 2A, a radio signal (also referred to as an excitation signal) sent by the terminal device may be a monophonic signal (namely, a continuous sine wave) or a multi-tone signal (namely, a signal having a specific bandwidth). The radio signal may carry data sent to the access network device, or may not carry the data sent to the access network device.

After receiving the radio signal from the terminal device, the reflector sends a reflected signal to the access network device. Specifically, a plurality of reflection array elements are disposed on the reflector, and the reflector reflects or absorbs, by controlling a connection and disconnection state of the reflection array elements, a radio signal received by the reflection array elements. In addition, the plurality of reflection array elements on the reflector may further form signal superposition together, and reflect the signal to a specific spatial direction, and therefore enhance performance of communication between the terminal and the access network device in the specific direction. In this embodiment of this disclosure, the reflector may be a passive device, that is, a power supply is not required in a process of receiving a radio signal and sending a reflected signal. Alternatively, the reflector may be a semi-passive device, that is, a power supply is required in a process of receiving a radio signal or sending a reflected signal. For example, a part that controls connection and disconnection of a reflection switch is powered on.

The access network device may be a device that can communicate with the terminal device. The access network device may be a base station, a relay station, or an access point. The base station may be a base transceiver station (base transceiver station, BTS) in a global system for mobile communications (global system for mobile communications, GSM) or a code division multiple access (code division multiple access, CDMA) network, or may be an NB (NodeB) in wideband code division multiple access (wideband code division multiple access, WCDMA), or may be an eNB or an eNodeB (evolved NodeB) in long term evolution (long term evolution, LTE). The base station device may alternatively be a radio controller in a cloud radio access network (cloud radio access network, CRAN) scenario. The base station device may alternatively be a base station device in a 5G network or a network device in a future evolved PLMN. The base station device may alternatively be a wearable device or a vehicle-mounted device.

The terminal device may be user equipment (user equipment, UE), an access terminal, a terminal unit, a terminal station, a mobile station, a remote station, a remote terminal, a mobile device, a terminal, a wireless communication device, a terminal agent, a terminal apparatus, or the like. The access terminal may be a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device, another processing device connected to a wireless modem, a vehicle-mounted device, a wearable device, a terminal device in a future 5G network, a terminal device in a future evolved PLMN, or the like.

It should be noted that the terminal device may also have another name, for example, may be referred to as an exciter, a helper (helper), an interrogator (interrogator), a reader (reader), or user equipment (user equipment, UE). For ease of description, the terminal device is referred to as a terminal device in embodiments of this disclosure. Correspondingly, the reflector may have another name, for example, may be referred to as an intelligent reflecting surface (intelligent reflecting surface), a reflection array, an intelligent reflecting array (intelligent reflecting array), a reflector, an intelligent reflector, a reflection device (a backscatter device), a passive device (passive device), a semi-passive device (semi-passive device), or a signal scattering device (an ambient signal device). For ease of description, the reflector is referred to as a reflector in embodiments of this disclosure. The access network device may also have another name, for example, may be referred to as a receiver, an access point, or a base station. For ease of description, the access network device is referred to as an access network device in embodiments of this disclosure.

Before embodiments of this disclosure are described, some terms in embodiments of this disclosure are first described, to help a person skilled in the art have a better understanding.

(1) Modulation and demodulation: Modulation is a process in which data of a signal source is processed and added to a carrier, so that the data is in a form suitable for channel transmission. Different modes correspond to different modulation methods, for example, multi-carrier modulation or single-carrier modulation, phase-shift keying (phase-shift keying, PSK) modulation or amplitude-shift keying (amplitude-shift keying, ASK) modulation. Demodulation is an inverse process of modulation, in which original data bits or symbols are recovered from a signal. Demodulation may also be referred to as detection sometimes.

(2) Orthogonal frequency division multiplexing (orthogonal frequency division multiplexing, OFDM) is a multi-carrier transmission waveform of frequency division multiplexing, and signals (also referred to as carriers/subcarriers) participating in multiplexing are orthogonal. In an OFDM technology, a high-speed data stream is converted into a plurality of parallel low-speed data streams through serial/parallel conversion, and then the low-speed data streams are allocated to several subcarriers of different frequencies for transmission. In the OFDM technology, orthogonal subcarriers are used, so that spectrums of the subcarriers overlap. In a conventional FDM multi-carrier modulation system, a guard interval is required between subcarriers. Compared with the conventional FDM multi-carrier modulation system, the OFDM technology improves spectrum utilization.

Figure 2B:
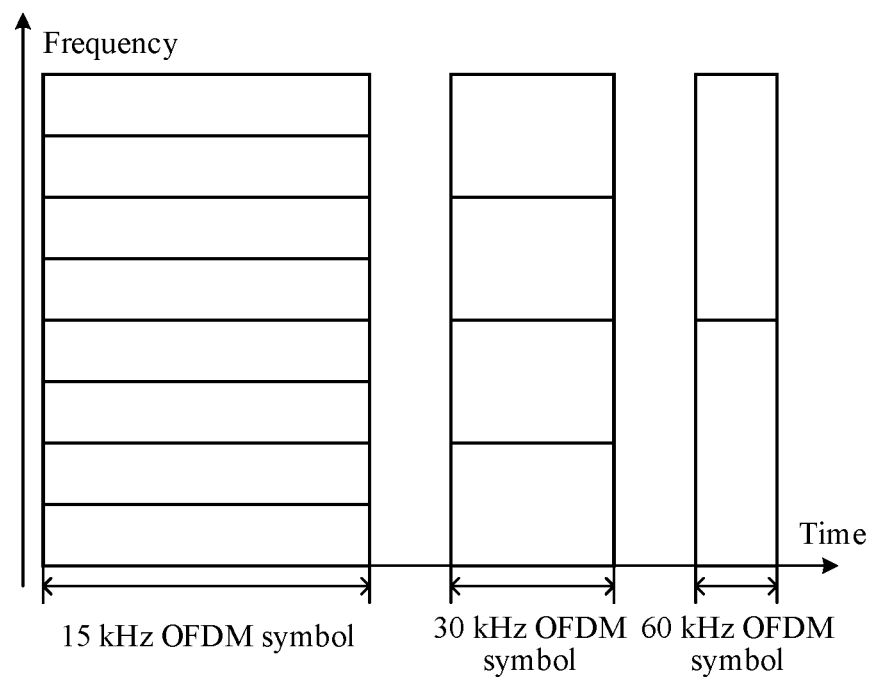
FIG. 2B is a schematic diagram of a subcarrier and a subcarrier width according to an embodiment of this disclosure.

(3) Subcarrier: In a multi-carrier waveform, a transmitted signal is a bandwidth signal, and the bandwidth signal includes many signals with different frequencies, and intervals between these frequencies are the same. These different frequencies are referred to as subcarriers. Data of a network device and a terminal device may be modulated onto these subcarriers, and these subcarriers are orthogonal in a period of time. A 15 kHz subcarrier spacing (subcarrier spacing, SCS), 30 kHz SCS and a 60 kHz SCS currently supported by a cellular system are used as an example. A subcarrier and a subcarrier width are shown in FIG. 2B. A space of each frequency domain is a subcarrier, and may be used to transmit data.

(4) Reference signal (reference signal, RS): Reference signals may be classified into a demodulation reference signal (demodulation reference signal, DMRS), a channel state information reference signal (channel state information reference signal, CSI-RS), a phase tracking reference signal (phase tracking reference signal, PTRS), and the like based on a function reference signal. A transmitting end or a receiving end knows or may infer, according to a predetermined rule, time and frequency locations of a signal, and a channel through which a signal/symbol carried on a time resource and a frequency resource passes or another unexpected phenomenon to which a signal/symbol carried on a time resource and a frequency resource is subject. The reference signal is used to obtain a known signal that is affected by an external (for example, a spatial channel, or non-ideality of a transmitting or receiving end device) during transmission, and is generally used for channel estimation, signal demodulation assistance, and detection. For example, the DMRS and the CSI-RS are used to obtain channel information, and the PTRS is used to obtain phase variation information.

It should be noted that a communication system and a service scenario described in embodiments of this disclosure are intended to describe the technical solutions in embodiments of this disclosure more clearly, and do not constitute a limitation on the technical solutions provided in embodiments of this disclosure. A person of ordinary skill in the art may know that, with evolution of network architectures and emergence of new service scenarios, the technical solutions provided in embodiments of this disclosure are also applicable to similar technical problems.

The following describes embodiments of this disclosure in detail with reference to the accompanying drawings. In addition, it should be understood that in embodiments of this disclosure, at least one may be alternatively described as one or more, and more may represent two, three, four, or more. This is not limited in this disclosure.

In embodiments of this disclosure, "/" may represent an "or" relationship between associated objects. For example, AB may represent A or B. "And/or" may be used to indicate that there are three relationships between associated objects. For example, A and/or B may represent the following three cases: Only A exists, both A and B exist, and only B exists. A and B may be singular or plural. To facilitate description of the technical solutions in embodiments of this disclosure, in embodiments of this disclosure, terms such as "first" and "second" may be used to distinguish between technical features with same or similar functions. The terms such as "first" and "second" do not limit a quantity and an execution sequence, and the terms such as "first" and "second" do not indicate a definite difference. In embodiments of this disclosure, terms such as "example" or "for example" are used to represent giving an example, an illustration, or a description. Any embodiment or design scheme described with "example" or "for example" should not be explained as being more preferred or having more advantages than another embodiment or design scheme. Use of the term such as "example" or "for example" is intended to present a related concept in a specific manner for ease of understanding.

In reflection-assisted communication, after a plurality of reflectors access a base station, if UE does not need to communicate with the base station, and a reflection array element on the reflector always reflects a radio signal or absorbs a radio signal, power consumption of the reflector is high, and signal interference is also caused to a network.

Currently, there is another signal transmission method that can improve signal transmission performance, but there is also a specific limitation. For example, both the base station and a terminal may use beamforming, so that signal energy is concentrated in a beam direction, and therefore transmission performance is improved. Although the signal transmission performance can be improved through beamforming, an optimal effect cannot be obtained due to a limitation of a spatial channel. Particularly, for non-line-of-sight transmission, a wireless communication signal is usually severely attenuated by a scatterer or an obstacle in an environment. Even if a high-gain beam is used, good communication performance cannot be obtained. For another example, currently, the base station may communicate with the terminal through a repeater. Although the repeater can extend a coverage area, the repeater has a high requirement on signal processing. Therefore, power consumption is high, deployment is difficult, and a delay in signal processing may be prolonged.

Figure 3:
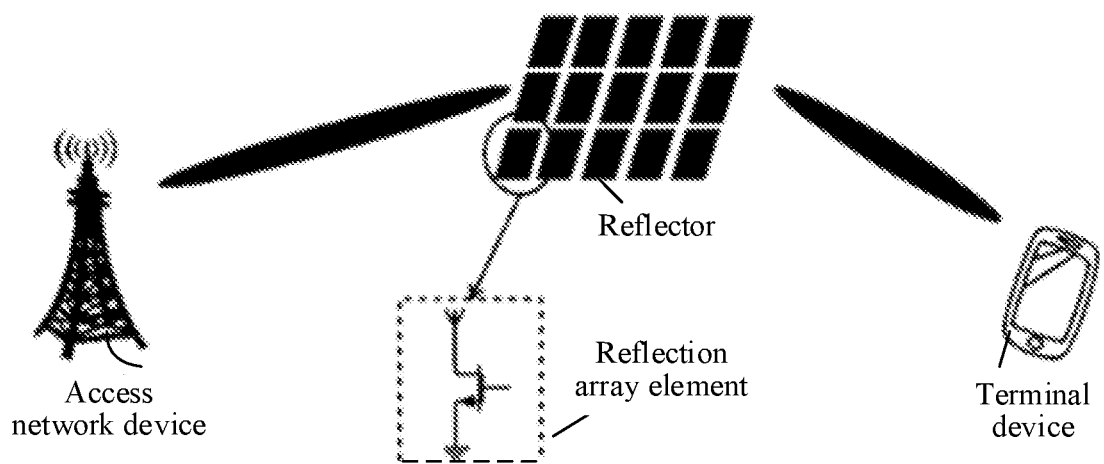
FIG. 3 is a schematic diagram of a communication process according to an embodiment of this disclosure.

The present disclosure provides a communication method. In the method, a reflector is used to assist in communication between a terminal and an access network device, and in a reflector-assisted communication process, the reflector is indicated to be in a working mode when it is required by the terminal or the access network device, to assist in communication, and the reflector is indicated to be in a sleep mode when it is required by the terminal or the access network device, to reduce power consumption. As shown in FIG. 3, a terminal device or a network device sends different indication information to a reflector, to trigger the reflector to enter a working mode or a sleep mode.

Figure 4:
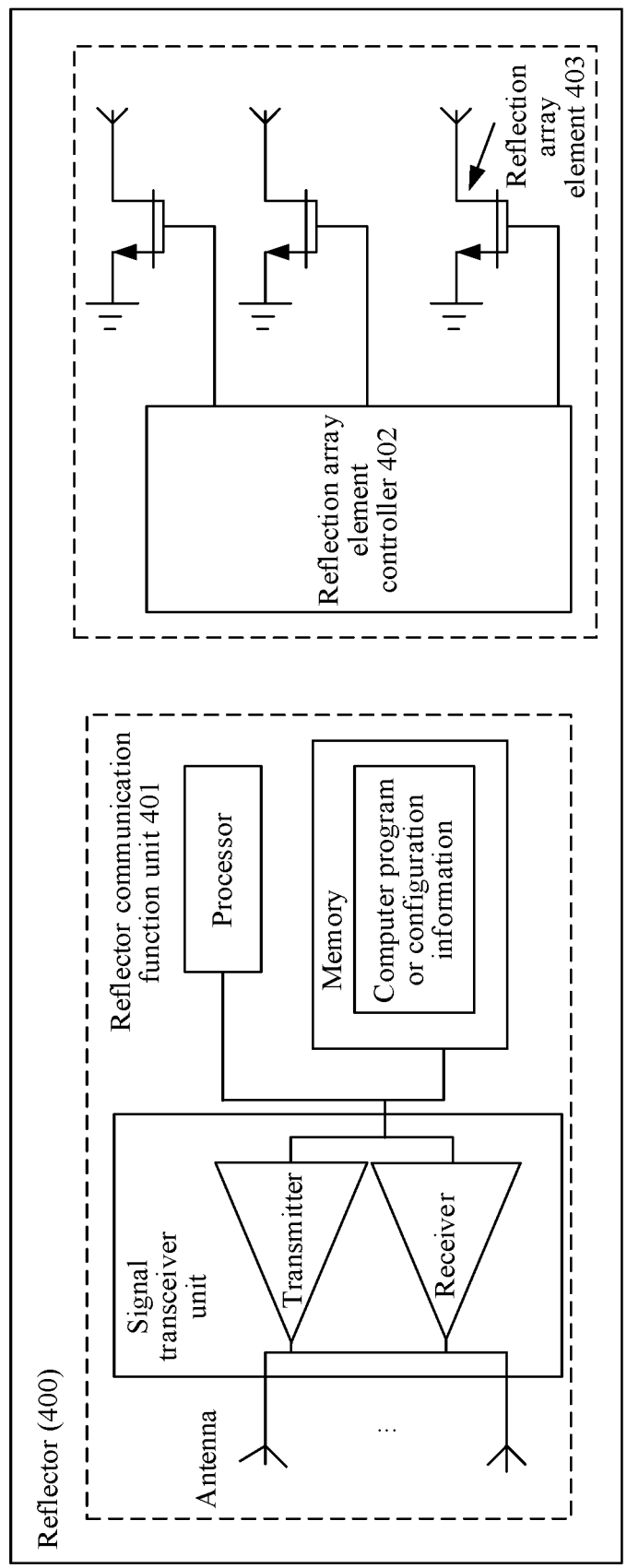
FIG. 4 is a schematic diagram of a structure of a reflector according to an embodiment of this disclosure.

FIG. 4 shows an example of a structure of a reflector. Logically, the reflector includes a plurality of parts: a reflector communication function unit 401, a reflection array element controller 402, and a reflection array element 403. The reflector communication function unit 401 is configured to perform data communication with an access network device or a terminal device. The reflection array element controller 402 is configured to control a status of each reflection array element based on received signaling. The reflection array element 403 is configured to implement an action such as reflection or absorption on a signal. The reflector communication function unit 401 and the reflection array element controller 402 may be active, and the reflection array element 403 is passive.

A basic working principle of the reflection array element is to reflect or absorb a received signal through a simple circuit. During reflection, the reflection array element may further superimpose a phase or an amplitude on a reflected signal, and then reflect the reflected signal. In different states of the reflection array element, different amplitudes (or actions such as controlling the reflected signal or absorbing a signal) and/or phases may be superimposed (or multiplied) on a received signal. For example, a simple reflection array element performs reflection in two states: a connection state and a disconnection state. That is, two states of the reflection array element are a signal reflection state and a signal absorption state. In a reflection state, the reflection array element directly reflects a received signal. In an absorption state, the reflection array element absorbs a received signal.

A reflection state matrix (or referred to as a reflection state vector, a reflection state, a reflection matrix, or a reflection vector) refers to a correspondence between the reflection array element of the reflector and a status of the reflection array element. Each index in a reflection state matrix index corresponds to a reflection state matrix. For example, it is assumed that the reflector has N reflection array elements, a reflection state matrix S is an $N_0 \times N_1$ matrix, and there are $N_0 \times N_1 = K$ reflection state matrices in total. For example, $N_0 \times N_1$ represents a reflector array having $N_0$ rows and $N_1$ columns, which respectively correspond to $N_0$ reflectors in a row direction and $N_1$ reflectors in a column direction. For another example, a value of each element in the reflection state matrix S is $\{0, 1\}$, indicating that each reflector may work in two states: reflection (represented by 1) and non-reflection (represented by 0). For another example, K reflection state matrices are indicated by a field of $\lceil \log_2 K \rceil$ bits, and a value of the field is an index. For example, a matrix S whose index is 001 has only three positions indicating 1. The three positions are respectively (X1, Y1), (X2, Y2), and (X3, Y3). It indicates that reflection array elements at the positions of (X1, Y1), (X2, Y2), and (X3, Y3) are in a connection state, and other reflection array elements are in a disconnection state.

In another implementation, the reflection state matrix may be further represented using a signal, for example, a reference signal (reference signal), a data signal, and a reference signal and a data signal, sent by using time, frequency, and code domains, or the like. That is, the "reflection state matrix" in embodiments of this specification may be replaced with a corresponding "reflection signal", or the "reflection state matrix index" in this specification may be replaced with a corresponding "reflection signal index".

For example, if the reflector reflects L reference signals and/or data signals at K pieces of time, resources of the K pieces of time (or at least one of a time index, a frequency index, or a code domain index corresponding to the K pieces of time) may represent K reflection state matrices. Alternatively, signals on the resources of the K pieces of time (or at least one of a time index, a frequency index, or a code domain index corresponding to the K pieces of time) may represent K reflection state matrices.

For example, the reflector reflects L reference signals and/or data signals at K pieces of time. In this case, the L signals may represent L or K reflection state matrices.

The following describes in detail a communication method according to this disclosure with reference to a plurality of embodiments.

Embodiment 1

Figure 5:
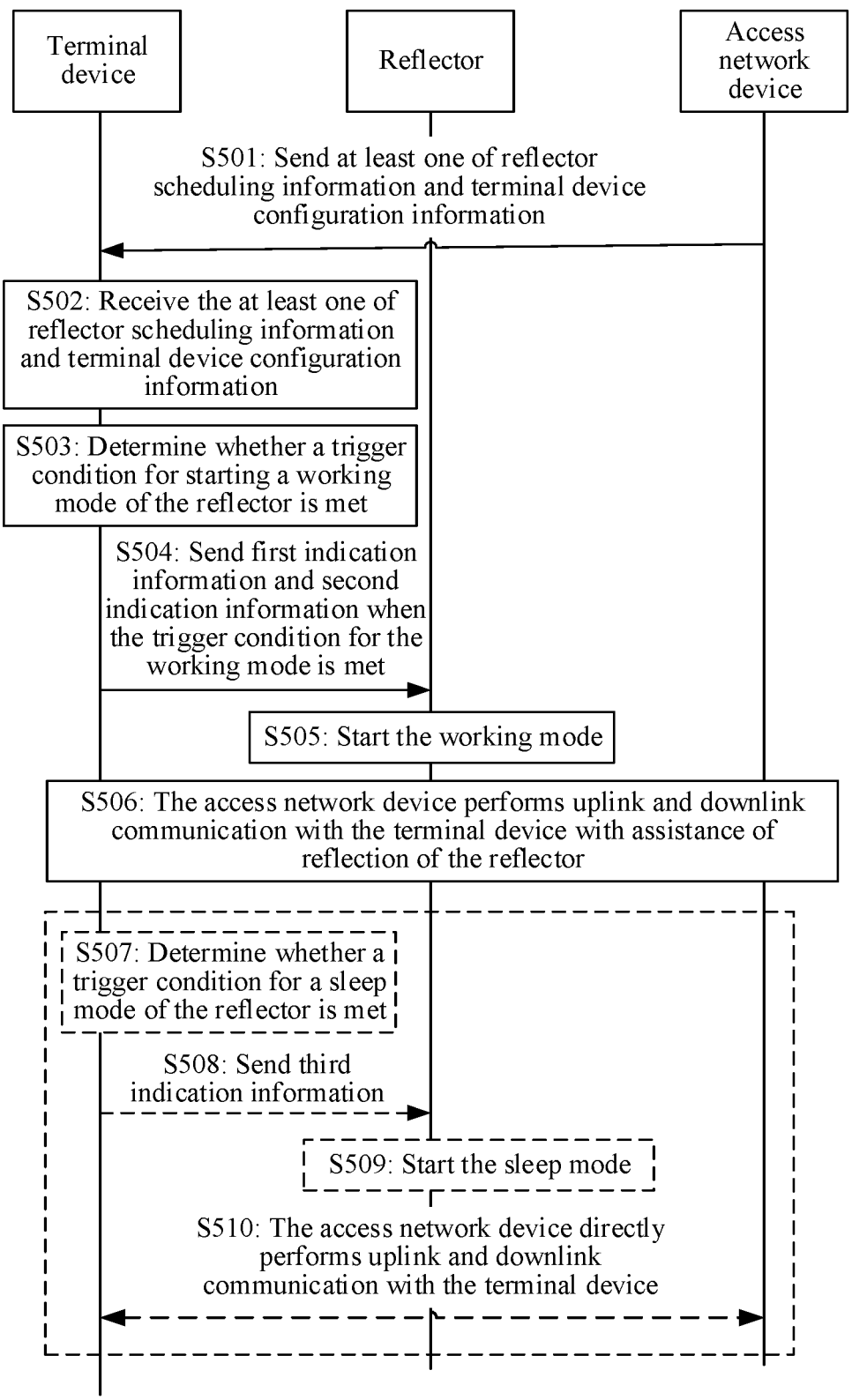
FIG. 5 is a schematic flowchart of a communication method according to an embodiment of this disclosure.

FIG. 5 is a schematic flowchart of a communication method according to an embodiment of this disclosure. The method includes the following steps.

S501: An access network device sends at least one of reflector scheduling information and terminal device configuration information to a terminal device.

Specifically, before reflector-assisted communication is performed, the access network device may send the reflector scheduling information and/or the terminal device configuration information to the terminal device by using at least one of radio resource control (radio resource control, RRC) signaling, a medium access control control element (medium access control control element, MAC CE), a medium access control protocol data unit (medium access control protocol data unit, MAC PDU), downlink control information (downlink control information, DCI), a system message, and the like.

The terminal device configuration information includes information about a resource, for example, at least one of a time domain resource, a frequency domain resource, and a code domain resource (including a signal time granularity, a length, a periodicity, and the like) of a reflection link, and may further include parameters, for example, a threshold of a reference signal received power (reference signal received power, RSRP) and a threshold of reference signal received quality (reference signal received quality, RSRQ), required for triggering a reflector to be in a working mode. The reflection link refers to a communication link between the terminal device or the access network device and the reflector.

The reflector scheduling information includes: a signal reflection rate, and information about a resource, for example, at least one of a time domain resource, a frequency domain resource, and a code domain resource (including one or more of start time, a time length, a periodicity, and the like), occupied by the reflector in the working mode, and may further include an identifier of the reflector (for example, a number of the reflector) and a reflection state matrix index (or number).

In a possible embodiment, before step 501 is performed, the access network device first establishes a connection to the reflector, and the access network device first performs time synchronization with the reflector, and then obtains, from the reflector, at least one piece of information such as a quantity of reflection state matrices supported by the reflector, a correspondence between a reflection state matrix and a downlink signal, a correspondence between a reflection state matrix and a coverage area (or a geographical location), and a reflection capability. In this way, after obtaining these pieces of information, the access network device generates the reflector scheduling information, to control a corresponding reflection state matrix of the reflector to reflect a signal.

In a possible embodiment, the access network device may periodically (or aperiodically) send a downlink signal (for example, a synchronization signal (synchronization signal, SS)/a broadcast channel block (a physical broadcast channel block, PBCH), which is also referred to as an SSB or a channel state information reference signal (channel state information reference signal, CSI-RS) in a protocol) to the terminal device. The downlink signal is used for time-frequency synchronization between the terminal and the access network device.

S502: The terminal device receives at least one of the reflector scheduling information and the terminal device configuration information from the access network device.

Further, the terminal device may determine, based on the received reflector scheduling information, whether a reflector exists around the terminal, and determine information about a time-frequency resource, information about a code domain resource, and the like of the reflector in the working mode.

S503: The terminal device determines whether a trigger condition for starting the working mode of the reflector is met.

Specifically, in a possible case, if the terminal device receives the reflector scheduling information and/or the terminal device configuration information from a system message associated with a specified downlink signal, the terminal device determines that the trigger condition is met. The specified downlink signal may be specified by the access network device, and the system message associated with the specified downlink signal may be a system information block (system information block, SIB) 1, or a SIB with another number, or even a master information block (master information Block, MIB).

In another possible case, the terminal device may determine, based on at least one of signal quality, quality of service (quality of service, QoS), power headroom, and a signal blocking status (for example, the terminal may sense a blocking status of a terminal antenna by a human body or the like), whether the trigger condition for triggering the reflector to start the working mode is met. The service quality may refer to a transmission rate (or a related modulation coding scheme (modulation coding scheme, MCS), channel quality information (channel quality information, CQI), a precoding matrix index (precoding matrix index, PMI), rank information (rank information, RI), power headroom, or the like), a transmission delay requirement, or the like.

For example, when signal quality of a downlink signal measured by the terminal device is less than a first signal quality threshold, the reflector is triggered to start the working mode. For another example, when quality of service of a service measured by the terminal device does not meet a first specified service requirement, the reflector is triggered to start the working mode. The working mode means that a reflector antenna of the reflector reflects a radio signal received from the terminal device or the access network device, or the reflector assists in communication between the terminal device and the access network device.

S504: The terminal device sends first indication information and second indication information to the reflector when the trigger condition for the working mode is met.

The first indication information indicates the reflector to start the working mode, the second indication information indicates at least one of a communication resource occupied by the reflector in the working mode and a reflection matrix index. The communication resource includes at least one of a time domain resource, a frequency domain resource, or a code domain resource. The first indication information and the second indication information may be carried in a same message, or may be carried in different messages. For example, the first indication information (or the second indication information) may be carried on a physical random access channel (physical random access channel, PRACH). Alternatively, the first indication information (or the second indication information) may be carried on a sounding reference signal (sounding reference signal, SRS). A sequence (including a root sequence and a logical number of the sequence) corresponding to the PRACH or the SRS, a time-frequency resource on which the PRACH or the SRS is located, and the like are indicated by the access network device. To reduce signaling overheads, the terminal device may send indication information to the reflector on a PRACH resource associated with a synchronization signal.

Specifically, the terminal device may send the first indication information and the second indication information to the reflector by using a reflection link resource configured by the access network device. Alternatively, the terminal device selects at least one time-frequency resource from the reflection link resource configured by the access network device, to send the first indication information and the second indication information.

S505: The reflector starts the working mode after receiving the first indication information and the second indication information.

In other words, after receiving the second indication information, the reflector determines the time domain resource, the frequency domain resource, the code domain resource, and the like for the working mode based on the second indication information, the reflector determines a reflection state matrix of the reflector based on the second indication information, and then reflects a signal by using a reflection array element in the reflection state matrix.

S506: The access network device performs uplink and downlink communication with the terminal device with assistance of reflection of the reflector.

In other words, after the reflector starts the working mode, the reflector may reflect, based on a corresponding reflection state matrix, a signal on a resource indicated by the second indication information.

It should be noted that, in a process of assisted communication using the reflector for the terminal device, the terminal device further monitors in real time whether signal quality or quality of service of the terminal device still meets the trigger condition for the working mode of the reflector. If the trigger condition is met, the terminal device continues the assisted communication using the reflector. Optionally, if the signal quality or the quality of service of the terminal device does not meet the trigger condition for the working mode of the reflector, the terminal device continues to perform the following steps, to determine whether to switch the reflector from the working mode to a sleep mode.

S507: The terminal device determines whether a trigger condition for the sleep mode of the reflector is met.

In a possible case, as shown in FIG. 5, the terminal device may determine, based on at least one of signal quality, quality of service (quality of service, QoS), power headroom, and a signal blocking status (for example, the terminal may sense a blocking status of a terminal antenna by a human body or the like), whether the trigger condition for triggering the reflector to start the sleep mode is met. For example, when signal quality of a downlink signal measured by the terminal device is greater than a second signal quality threshold, the reflector is triggered to start the sleep mode. For another example, when quality of service of a service measured by the terminal device is greater than a second specified service requirement, the reflector is triggered to start the sleep mode. The sleep mode means that the reflector antenna of the reflector does not reflect the radio signal received from the terminal device or the access network device, or the reflector does not assist in communication between the terminal device and the access network device.

S508: The terminal device sends third indication information to the reflector when the trigger condition for the sleep mode is met.

The third indication information indicates the reflector to start the sleep mode.

For example, the third indication information may be carried on a physical random access channel (physical random access channel, PRACH). Alternatively, the third indication information may be carried on a sounding reference signal (sounding reference signal, SRS). A sequence (including a root sequence and a logical number of the sequence) corresponding to the PRACH or the SRS, a time-frequency resource on which the PRACH or the SRS is located, and the like are indicated by the access network device. To reduce signaling overheads, the terminal device may send indication information to the reflector on a PRACH resource associated with a synchronization signal.

It should be noted that, in another possible embodiment, S507 to S508 may alternatively be replaced with the following possible embodiment:

In another possible case, the reflector may also determine, based on at least one of signal quality, quality of service, and a signal blocking status (for example, the terminal may sense a blocking status of a terminal antenna by a human body or the like), whether a trigger condition for triggering the reflector to start the sleep mode is met. For example, when signal quality of a downlink signal from the terminal device measured by a transmitter is greater than a second signal quality threshold, the reflector is triggered to start the sleep mode. For another example, when quality of service of a service of a radio signal from the terminal device measured by the transmitter is greater than a second specified service requirement, the reflector is triggered to start the sleep mode. The sleep mode means that the reflector antenna of the reflector does not reflect the radio signal received from the terminal device or the access network device, or the reflector does not assist in communication between the terminal device and the access network device.

S509: The reflector starts the sleep mode.

Alternatively, the reflector antenna absorbs all received radio signals of the terminal device, or the reflector does not assist in communication between the terminal device and the access network device.

S510: The access network device directly performs uplink and downlink communication with the terminal device.

It should be noted that the "working mode" in this embodiment may be described in another alternative manner, such as a working state, a reflection mode, a reflection state, or an operating state. Correspondingly, the "sleep mode" in this embodiment may be described in another alternative manner, for example, a sleep state, an absorption mode, an absorption state, or an off state.

In this embodiment of this disclosure, the terminal device indicates the reflector to start the assisted communication only when assistance is required, and indicates the reflector to stop working when the terminal does not need assistance. Therefore, power consumption can be reduced, and signal interference caused by the reflector to a network can be reduced to some extent.

Embodiment 2

Figure 6:
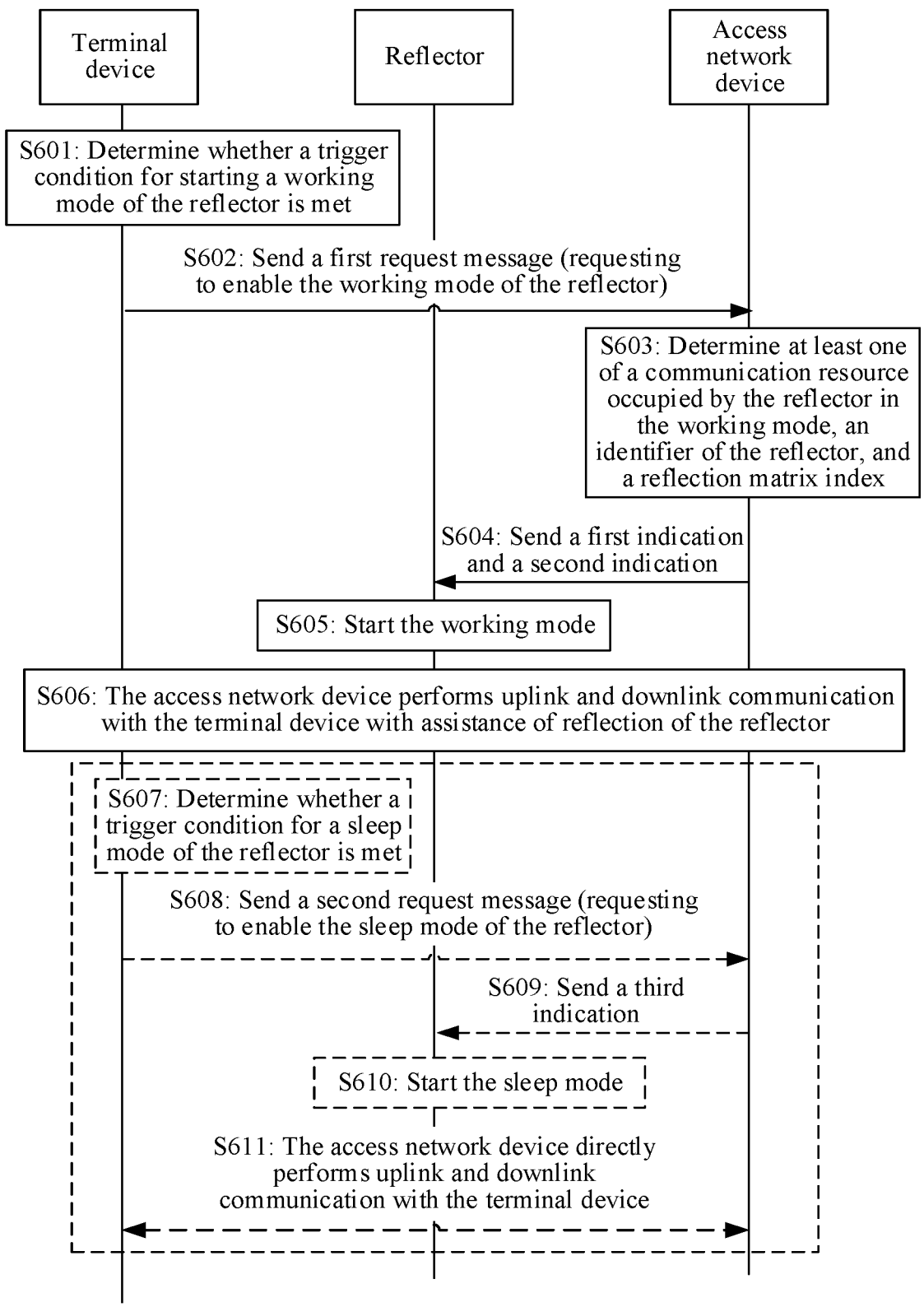
FIG. 6 is a schematic flowchart of another communication method according to an embodiment of this disclosure.

FIG. 6 is a schematic flowchart of another communication method according to an embodiment of this disclosure. The method includes the following steps.

S601: A terminal device determines whether a trigger condition for starting a working mode of a reflector is met.

Specifically, the terminal device may determine, based on at least one of signal quality, quality of service (quality of service, QoS), power headroom, and a signal blocking status (for example, the terminal may sense a blocking status of a terminal antenna by a human body or the like), whether the trigger condition for triggering the reflector to start the working mode is met. For example, when signal quality of a downlink signal measured by the terminal device is less than a first signal quality threshold, the reflector is triggered to start the working mode. For another example, when quality of service of a service measured by the terminal device does not meet a first specified service requirement, the reflector is triggered to start the working mode. The working mode means that a reflector antenna of the reflector reflects a radio signal received from the terminal device or an access network device, or the reflector assists in communication between the terminal device and the access network device.

Specifically, before S601 is performed, the terminal device first accesses the access network device. For a specific access method, refer to a current procedure in which UE in LTE or NR accesses a network. Details are not described herein again. After access or during access, the terminal device may learn, from the access network device side, whether a reflector exists, or learn whether there is a reflector that can assist in communication between the access network device and the terminal device. For example, the terminal device learns of existence of the reflector through a random access message 2 (Msg2) or a random access message 4 (Msg4) from the access network device. For another example, a base station may notify the terminal device of the existence of the reflector by using information such as radio resource control (radio resource control, RRC) signaling, a medium access control control element (medium access control control element, MAC CE), and downlink control information (downlink control information, DCI).

S602: The terminal device sends a first request message to the access network device when the trigger condition for the working mode is met, where the first request message requests the access network device to enable the working mode of the reflector.

For example, when the trigger condition for the working mode is met, the terminal device sends a request message to the access network device in any uplink transmission manner such as a transmission manner using an uplink data channel, an uplink control channel, a random access channel, or an SRS. Resources occupied by the uplink data channel, the uplink control channel, the random access channel, the SRS, and the like are pre-scheduled by the access network device.

S603: The access network device determines, after receiving the first request message, at least one of a communication resource occupied by the reflector in the working mode, an identifier of the reflector, and a reflection matrix index.

The communication resource occupied by the reflector in the working mode includes: information about a resource, for example, at least one of a time domain resource, a frequency domain resource, and a code domain resource (including one or more of start time, a time length, a periodicity, and the like) occupied by the reflector in the working mode, and may further include the identifier of the reflector (for example, a number of the reflector) and the reflection state matrix index (or number). For example, reflector scheduling information includes time at which the reflector starts the working mode, the reflection state matrix index, and the like. Optionally, if the reflector may perform reflection based on a specific frequency band, the reflector scheduling information includes a frequency location, for example, a carrier frequency location of the reflector.

It should be noted that the access network device may further exchange signaling with the terminal device and the reflector, to determine an optimal or better reflection state matrix, and further determine the reflection state matrix index in the reflector scheduling information.

S604: The access network device sends a first indication and a second indication to the reflector.

The first indication indicates the reflector to start the working mode. The second indication indicates at least one of the communication resource occupied by the reflector in the working mode, the identifier of the reflector, and the reflection matrix index. The communication resource includes at least one of the time domain resource, the frequency domain resource, or the code domain resource. First indication information and second indication information may be carried in a same message, or may be carried in different messages.

S605: The reflector starts the working mode after receiving the first indication information and the second indication information.

In other words, after receiving the second indication information, the reflector determines the time domain resource, the frequency domain resource, the code domain resource, and the like for the working mode based on the second indication information, the reflector determines a reflection state matrix of the reflector based on the second indication information, and then reflects a signal by using a reflection array element in the reflection state matrix.

In a possible implementation, both the terminal device and the reflector simultaneously receive downlink control information of the access network device, and the reflector determines, by obtaining control information, time for turning on a reflection surface. If downlink control information of the terminal device and the reflector is carried on a same channel (for example, DCI of a same PDCCH), both the reflector and the terminal device need to know a time location, a frequency location, and a C-RNTI that correspond to the PDCCH. The access network device notifies the reflector of notification information.

S606: The access network device performs uplink and downlink communication with the terminal device with assistance of reflection of the reflector.

In other words, after the reflector starts the working mode, the reflector may reflect, based on a corresponding reflection state matrix, a signal on a resource indicated by the second indication information. Specifically, in reflector-assisted communication, the terminal sends information to the access network device, and/or the access network device sends information to the terminal.

It should be noted that, in a process of assisted communication using the reflector for the terminal device, the terminal device further monitors in real time whether signal quality or quality of service of the terminal device still meets the trigger condition for the working mode of the reflector. If the trigger condition is met, the terminal device continues the assisted communication using the reflector. Optionally, if the signal quality or the quality of service of the terminal device does not meet the trigger condition for the working mode of the reflector, the terminal device continues to perform the following steps, to determine whether to switch the reflector from the working mode to a sleep mode. The sleep mode means that the reflector antenna of the reflector does not reflect the radio signal received from the terminal device or the access network device, or the reflector does not assist in communication between the terminal device and the access network device.

S607: The terminal device determines whether a trigger condition for the sleep mode of the reflector is met.

Specifically, the terminal device may determine, based on at least one of signal quality, quality of service (quality of service, QoS), power headroom, and a signal blocking status (for example, the terminal may sense a blocking status of a terminal antenna by a human body or the like), whether the trigger condition for triggering the reflector to start the sleep mode is met. For example, when signal quality of a downlink signal measured by the terminal device is greater than a second signal quality threshold, the reflector is triggered to start the sleep mode. For another example, when quality of service of a service measured by the terminal device is greater than a second specified service requirement, the reflector is triggered to start the sleep mode. The sleep mode means that the reflector antenna of the reflector does not reflect the radio signal received from the terminal device or the access network device, or the reflector does not assist in communication between the terminal device and the access network device.

S608: The terminal device sends a second request message to the access network device when the trigger condition for the sleep mode is met, where the second request message requests the access network device to enable the sleep mode of the reflector.

S609: The access network device sends a third indication to the reflector after receiving the second request message, where the third indication indicates the reflector to start the sleep mode.

For example, the third indication may be at least one of reflection link control information, a reflection link radio resource control message, a reflection link medium access control message, and the like of the reflector.

It should be noted that, in another possible embodiment, S607 to S609 may alternatively be replaced with the following possible embodiment:

In another possible case, the reflector may also determine, based on at least one of signal quality, quality of service, and a signal blocking status (for example, the terminal may sense a blocking status of a terminal antenna by a human body or the like), whether the trigger condition for triggering the reflector to start the sleep mode is met. For example, when signal quality of a downlink signal from the terminal device measured by a transmitter is greater than a second signal quality threshold, the reflector is triggered to start the sleep mode. For another example, when quality of service of a service of a radio signal from the terminal device measured by the transmitter is greater than a second specified service requirement, the reflector is triggered to start the sleep mode. The sleep mode means that the reflector antenna of the reflector does not reflect the radio signal received from the terminal device or the access network device, or the reflector does not assist in communication between the terminal device and the access network device.

S610: The reflector starts the sleep mode.

Alternatively, the reflector antenna absorbs all received radio signals of the terminal device, or the reflector does not assist in communication between the terminal device and the access network device.

S611: The access network device directly performs uplink and downlink communication with the terminal device.

It should be noted that the "working mode" in this embodiment may be described in another alternative manner, such as a working state, a reflection mode, a reflection state, or an operating state. Correspondingly, the "sleep mode" in this embodiment may be described in another alternative manner, for example, a sleep state, an absorption mode, an absorption state, or an off state.

In this embodiment of this disclosure, after the terminal device accesses the access network device, when the assisted communication is required, the terminal device requests the access network device to trigger the reflector to assist in communication, the access network device indicates the reflector to assist the terminal in sending, and the reflector reflects a signal based on time and frequency information included in indication information. When the terminal device does not need the assisted communication, the terminal device requests the access network device to trigger the reflector to stop the assisted communication. In this case, the access network device indicates the reflector to stop working. Therefore, power consumption can be reduced, and signal interference caused by the reflector to a network can be reduced to some extent.

Embodiment 3

Figure 7:
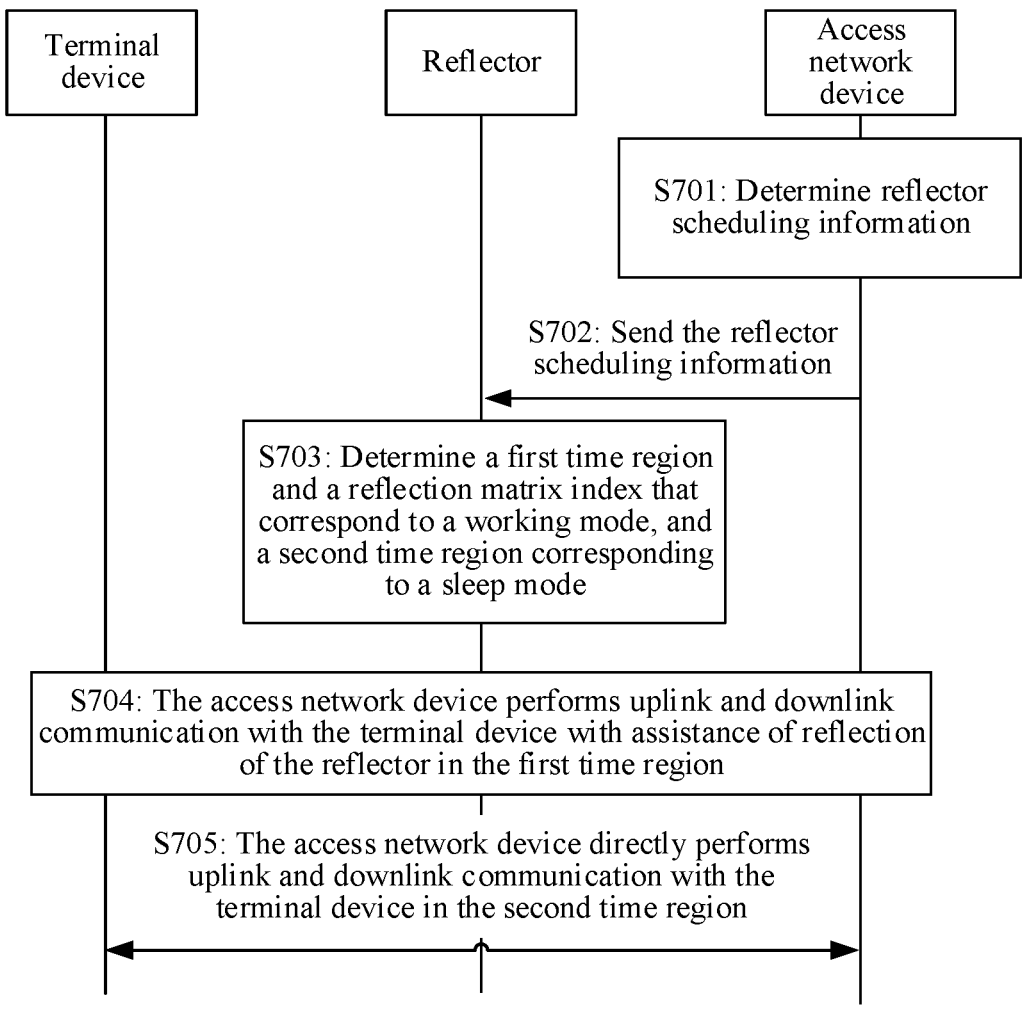
FIG. 7 is a schematic flowchart of another communication method according to an embodiment of this disclosure.

FIG. 7 is a schematic flowchart of another communication method according to an embodiment of this disclosure. The method includes the following steps.

S701: An access network device determines reflector scheduling information, where the reflector scheduling information includes at least one of a communication resource occupied in a working mode, an identifier of a reflector, and a reflection matrix index.

The communication resource occupied by the reflector in the working mode includes: information about a resource, for example, at least one of a time domain resource, a frequency domain resource, and a code domain resource (including one or more of start time, a time length, a periodicity, and the like), occupied by the reflector in the working mode, and may further include the identifier of the reflector (for example, a number of the reflector) and the reflection state matrix index (or number). For example, the reflector scheduling information includes time at which the reflector starts the working mode, the reflection state matrix index, and the like. Optionally, if the reflector may perform reflection based on a specific frequency band, the reflector scheduling information includes a frequency location, for example, a carrier frequency location of the reflector.

It should be noted that the access network device may further exchange signaling with a terminal device and the reflector, to determine an optimal or better reflection state matrix, and further determine the reflection state matrix index in the reflector scheduling information.

S702: The access network device sends the reflector scheduling information to the reflector.

S703: The reflector determines, after receiving the reflector scheduling information, a first time region and the reflection matrix index that correspond to the working mode, and a second time region corresponding to a sleep mode.

In other words, after receiving the reflector scheduling information, the reflector determines to start the working mode in the first time region, and start the sleep mode in the second time region, and determines a carrier frequency, a code domain resource, and the like that are required by the reflector to perform assisted communication.

In a possible implementation, both the terminal device and the reflector simultaneously receive downlink control information of the access network device, and the reflector determines, by obtaining control information, time for turning on a reflection surface. If downlink control information of the terminal device and the reflector is carried on a same channel (for example, DCI of a same PDCCH), both the reflector and the terminal device need to know a time location, a frequency location, and a C-RNTI that correspond to the PDCCH. The access network device notifies the reflector of notification information.

S704: The access network device performs uplink and downlink communication with the terminal device in the first time region with assistance of reflection of the reflector.

In other words, when the reflector starts the working mode, the reflector may reflect, based on a corresponding reflection state matrix, a signal on a resource indicated by second indication information. Specifically, in reflector-assisted communication, the terminal sends information to the access network device, and the access network device sends information to the terminal.

S705: The access network device directly performs uplink and downlink communication with the terminal device in the second time region.

In other words, when the reflector starts the sleep mode, the reflector no longer reflects a signal to the terminal device.

It should be noted that the working mode means that a reflector antenna of the reflector reflects a radio signal received from the terminal device or the access network device, or the reflector assists in communication between the terminal device and the access network device. The sleep mode means that the reflector antenna of the reflector does not reflect the radio signal received from the terminal device or the access network device, or the reflector does not assist in communication between the terminal device and the access network device. The "working mode" in this embodiment may be described in another alternative manner, such as a working state, a reflection mode, a reflection state, or an operating state. Correspondingly, the "sleep mode" in this embodiment may be described in another alternative manner, for example, a sleep state, an absorption mode, an absorption state, or an off state.

In this embodiment of this disclosure, the terminal device does not need to determine whether a reflector exists around the terminal device. That is, the terminal device may be unaware to a reflector. The access network device indicates the reflector to assist in communication between the terminal and the access network device in the first time region, and indicates the reflector to no longer assist in communication between the terminal and the access network device in the second time region. In this case, the reflector stops working. Therefore, power consumption can be reduced, and signal interference caused by the reflector to a network can be reduced to some extent.

The foregoing mainly describes the solutions provided in this disclosure from a perspective of interaction between an exciter, a reflector, and a receiver. It may be understood that, to implement the foregoing functions, each network element includes a corresponding hardware structure and/or software module (or unit) for performing each function. A person skilled in the art should easily be aware that, in combination with units and algorithm steps of the examples described in embodiments disclosed in this specification, this disclosure may be implemented by hardware or a combination of hardware and computer software. Whether a function is performed by hardware or hardware driven by computer software depends on particular disclosure s and design constraints of the technical solutions. A person skilled in the art may use different methods to implement the described functions for each particular disclosure, but it should not be considered that the implementation goes beyond the scope of this disclosure.

Figure 8:
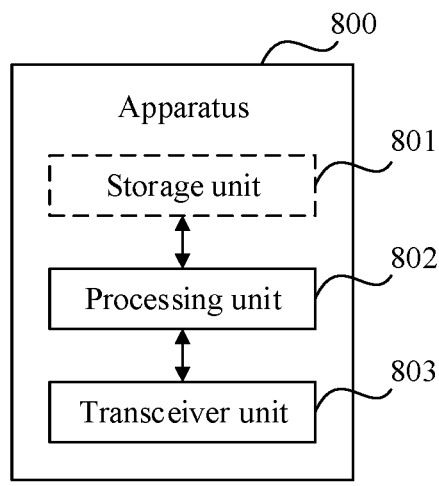
FIG. 8 is a schematic block diagram of a communication apparatus according to an embodiment of this disclosure.

When an integrated unit (module) is used, FIG. 8 is a possible example block diagram of a communication apparatus according to an embodiment of this disclosure. A communication apparatus 800 may exist in a form of software. The apparatus 800 may include a processing unit 802 and a transceiver unit 803.

In a possible design, the processing unit 802 is configured to implement a corresponding processing function. The transceiver unit 803 is configured to support the apparatus 800 in communicating with another network entity. Optionally, the transceiver unit 803 may include a receiving unit and/or a sending unit, which are respectively configured to perform a receiving operation and a sending operation. Optionally, the apparatus 800 may further include a storage unit 801, configured to store program code and/or data of the apparatus 800.

The apparatus 800 may be the reflector in any one of the foregoing embodiments (for example, the reflector is the reflector in Embodiment 1 to Embodiment 3), or may be a component, such as a chip, disposed in the reflector. The processing unit 802 may support the apparatus 800 in performing an action of the reflector in the foregoing method examples. Alternatively, the processing unit 802 mainly performs an internal action of the reflector in the method examples, and the transceiver unit 803 may support communication between the apparatus 800 and a terminal device and communication between the apparatus 800 and an access network device.

For specific actions performed by the processing unit 802 and the transceiver unit 803, refer to the descriptions in Embodiment 1 to Embodiment 3, and details are not described herein again.

Figure 9:
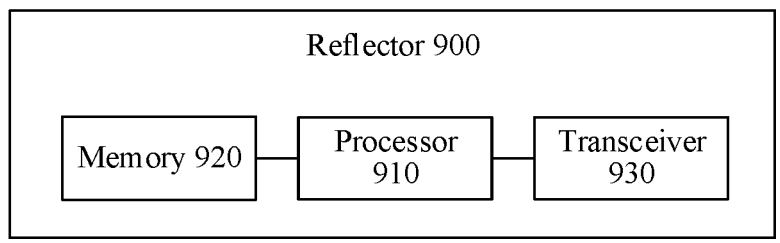
FIG. 9 is a schematic block diagram of a reflector according to an embodiment of this disclosure.

As shown in FIG. 9, an embodiment of this disclosure further provides a reflector 900. The reflector 900 includes a processor 910, a memory 920, and a transceiver 930. In a possible design, the memory 920 stores instructions, a program, or data, and the memory 920 may be configured to implement a function of the storage unit 801 in the foregoing embodiment. The processor 910 is configured to read the instructions, program, or data stored in the memory 920. When the instructions or program stored in the memory 920 are/is executed, the processor 910 is configured to perform an operation performed by the processing unit 802 in the foregoing embodiment, and the transceiver 930 is configured to perform an operation performed by the transceiver unit 803 in the foregoing embodiment.

It should be understood that the communication apparatus 800 or the reflector 900 in embodiments of this disclosure may correspond to the reflector in the communication method in embodiments of this disclosure, and operations and/or functions of the modules in the communication apparatus 800 or the reflector 900 are respectively used to implement corresponding procedures of the methods in Embodiment 1 to Embodiment 3. For brevity, details are not described herein again.

Figure 10:
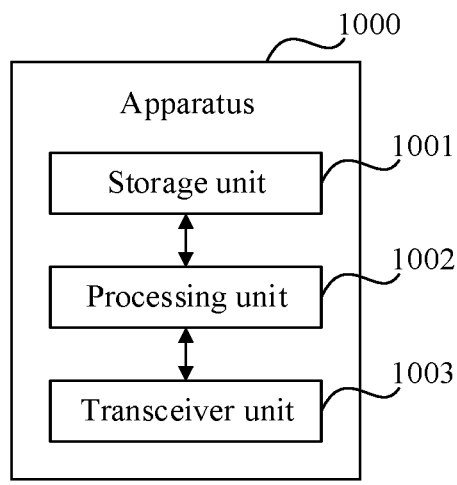
FIG. 10 is a schematic block diagram of a communication apparatus according to an embodiment of this disclosure.

When an integrated unit (module) is used, FIG. 10 is a still another possible example block diagram of a communication apparatus according to an embodiment of this disclosure. A communication apparatus 1000 may exist in a form of software. The apparatus 1000 may include a processing unit 1002 and a transceiver unit 1003. In a possible design, the processing unit 1002 is configured to implement a corresponding processing function. The transceiver unit 1003 is configured to support the apparatus 1000 in communicating with another network entity. Optionally, the transceiver unit 1003 may include a receiving unit and/or a sending unit, which are respectively configured to perform a receiving operation and a sending operation. Optionally, the apparatus 1000 may further include a storage unit 1001, configured to store program code and/or data of the apparatus 1000.

The apparatus 1000 may be the terminal device in any one of the foregoing embodiments (for example, the terminal device is the terminal device in Embodiment 1), or may be a component, such as a chip, disposed in the terminal device. The processing unit 1002 may support the apparatus 1000 in performing an action of the terminal device in the foregoing method examples. Alternatively, the processing unit 1002 mainly performs an internal action of the terminal device in the method examples, and the transceiver unit 1003 may support communication between the apparatus 1000 and the reflector and communication between the apparatus 1000 and the receiver.

Figure 11:
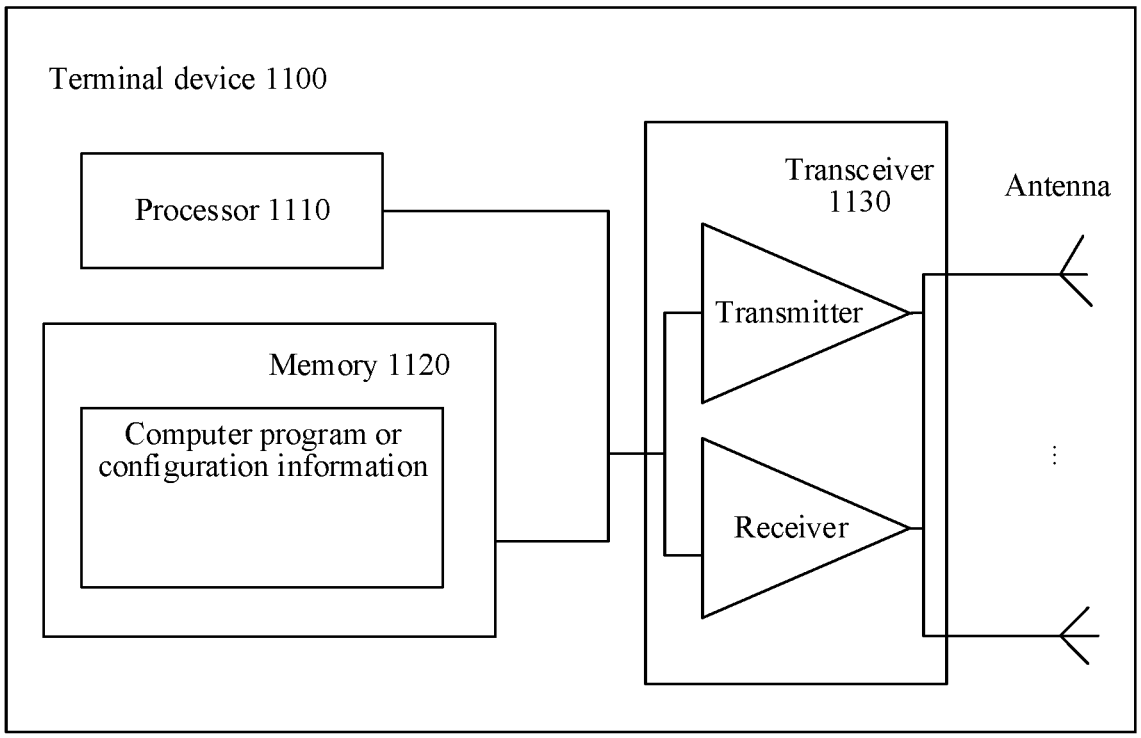
FIG. 11 is a schematic block diagram of a terminal device according to an embodiment of this disclosure.

As shown in FIG. 11, an embodiment of this disclosure further provides a terminal device 1100. The terminal device 1100 includes a processor 1110, a memory 1120, and a transceiver 1130. In a possible design, the memory 1120 stores instructions, a program, or data, and the memory 1120 may be configured to implement a function of the storage unit 1001 in the foregoing embodiment. The processor 1110 is configured to read the instructions, the program, or the data stored in the memory 1120. When the instructions or the program stored in the memory 1120 are/is executed, the processor 1110 is configured to perform an operation performed by the processing unit 1002 in the foregoing embodiment, and the transceiver 1130 is configured to perform an operation performed by the transceiver unit 1003 in the foregoing embodiment.

It should be understood that the communication apparatus 1000 or the terminal device 1100 in embodiments of this disclosure may correspond to the terminal device in the communication method in embodiments of this disclosure, and operations and/or functions of the modules in the communication apparatus 1000 or the terminal device 1100 are respectively used to implement corresponding procedures of the methods in Embodiment 1 to Embodiment 3. For brevity, details are not described herein again.

Figure 12:
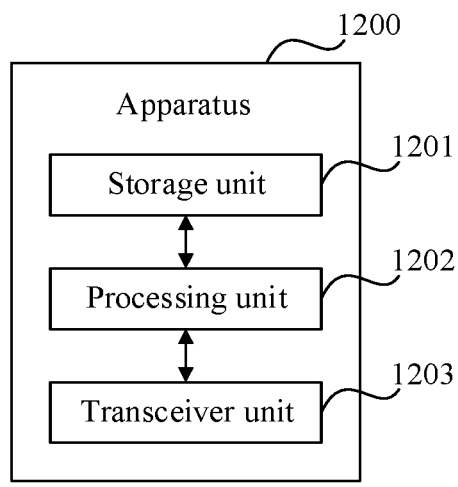
FIG. 12 is a schematic block diagram of a communication apparatus according to an embodiment of this disclosure.

When an integrated unit (module) is used, FIG. 12 is a possible example block diagram of still another communication apparatus according to an embodiment of this disclosure. The communication apparatus 1200 may exist in a form of software. The apparatus 1200 may include a processing unit 1202 and a transceiver unit 1203.

In a possible design, the processing unit 1202 is configured to implement a corresponding processing function. The transceiver unit 1203 is configured to support the apparatus 1200 in communicating with another network entity. Optionally, the transceiver unit 1203 may include a receiving unit and/or a sending unit, which are respectively configured to perform a receiving operation and a sending operation. Optionally, the apparatus 1200 may further include a storage unit 1201, configured to store program code and/or data of the apparatus 1200.

The apparatus 1200 may be the access network device in any one of the foregoing embodiments, or may be a component, such as a chip, disposed in the access network device. The processing unit 1202 may support the apparatus 1200 in performing an action of the access network device in the foregoing method examples. Alternatively, the processing unit 1202 mainly performs an internal action of the access network device in the method examples, and the transceiver unit 1203 may support communication between the apparatus 1200 and a terminal device and communication between the apparatus 1200 and a reflector.

Figure 13:
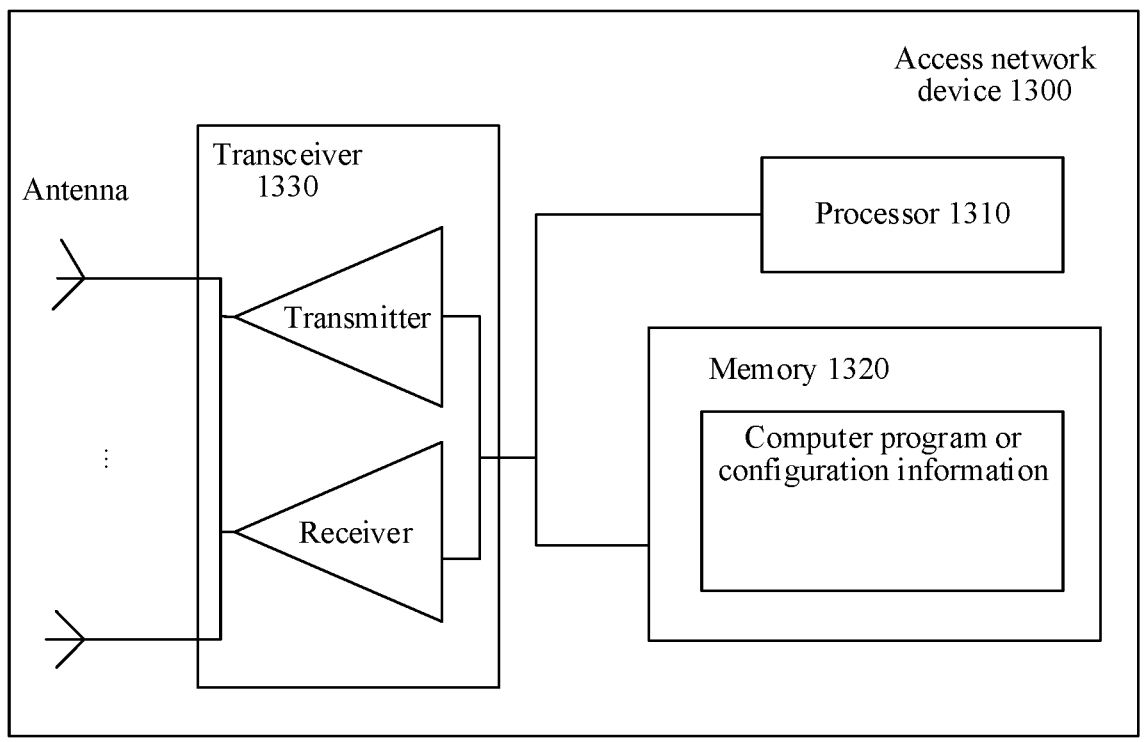
FIG. 13 is a schematic block diagram of an access network device according to an embodiment of this disclosure.

As shown in FIG. 13, an embodiment of this disclosure further provides an access network device 1300. The access network device 1300 includes a processor 1310, a memory 1320, and a transceiver 1330. In a possible design, the memory 1320 stores instructions, a program, or data, and the memory 1320 may be configured to implement a function of the storage unit 1201 in the foregoing embodiment. The processor 1310 is configured to read the instructions, the program, or the data stored in the memory 1320. When the instructions or the program stored in the memory 1320 are/is executed, the processor 1310 is configured to perform an operation performed by the processing unit 1202 in the foregoing embodiment, and the transceiver 1330 is configured to perform an operation performed by the transceiver unit 1203 in the foregoing embodiment.

It should be understood that the communication apparatus 1200 or the access network device 1300 in embodiments of this disclosure may correspond to the access network device in the communication method in embodiments of this disclosure, and operations and/or functions of the modules in the communication apparatus 1200 or the access network device 1300 are respectively used to implement corresponding procedures of the methods in Embodiment 1 to Embodiment 3. For brevity, details are not described herein again.

In another form of this embodiment, a computer-readable storage medium is provided. The computer-readable storage medium stores a program or instructions. When the program or the instructions are executed, the method in the foregoing method embodiments may be performed.

In another form of this embodiment, a computer program product including instructions is provided. When the instructions are executed, the method in the foregoing method embodiments may be performed.

In another form of this embodiment, a chip is provided, and is configured to execute a computer program or instructions stored in a memory. When the computer program or instructions are executed, the method in the foregoing method embodiments may be performed.

A person skilled in the art should understand that embodiments of this disclosure may be provided as a method, a system, or a computer program product. Therefore, this disclosure may use a form of hardware only embodiments, software only embodiments, or embodiments with a combination of software and hardware. In addition, this disclosure may use a form of a computer program product that is implemented on one or more computer-usable storage media (including but not limited to a disk memory, a CD-ROM, an optical memory, and the like) that include computer-usable program code.

This disclosure is described with reference to the flowcharts and/or block diagrams of the method, the device (system), and the computer program product according to embodiments of this disclosure. It should be understood that computer program instructions may be used to implement each procedure and/or each block in the flowcharts and/or the block diagrams and a combination of a procedure and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more procedures in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

The computer program instructions may alternatively be loaded onto a computer or another programmable data processing device, so that a series of operations and steps are performed on the computer or the another programmable device to generate computer-implemented processing. Therefore, the instructions executed on the computer or the another programmable device provide steps for implementing a specific function in one or more procedures in the flowcharts and/or in one or more blocks in the block diagrams.

Although some preferred embodiments of this disclosure have been described, a person skilled in the art can make additional changes and modifications to these embodiments once the person skilled in the art learns of the basic inventive concept. Therefore, the appended claims are intended to be construed as including the preferred embodiments and all changes and modifications falling within the scope of this disclosure.

Clearly, a person skilled in the art can make various modifications and variations to embodiments of this disclosure without departing from the spirit and scope of embodiments of this disclosure. This disclosure is intended to cover these modifications and variations provided that these modifications and variations of embodiments of this disclosure fall within the scope of protection defined by the following claims of this disclosure and their equivalent technologies.

What is claimed is:

1. A communication method, comprising:
   receiving first indication information indicating a reflector to start a working mode;
   receiving second indication information indicating a communication resource occupied by the reflector in the working mode, the communication resource comprising at least one of a time domain resource, a frequency domain resource, or a code domain resource; and
   sending, to an access network device or a terminal device, a reflected signal on the communication resource.

2. The method according to claim 1, wherein sending the reflected signal on the communication resource comprises:
   determining that the second indication information comprises an identifier of the reflector;
   sending, to the access network device, the reflected signal on the communication resource based on the determination.

3. The method according to claim 1, wherein sending the reflected signal on the communication resource comprises:
   determining that the second indication information comprises a reflection state matrix index;
   sending, to the access network device or the terminal device, the reflected signal on the communication resource based on the reflection state matrix index.

4. The method according to claim 1, the method further comprising:
   receiving third indication information indicating the reflector to start a sleep mode in which the reflector does not reflect a radio signal received from the access network device or the terminal device.

5. A communication method, comprising:
   receiving, from an access network device, reflector scheduling information that comprises a communication resource occupied by a reflector in a working mode;
   sending, to the reflector, first indication information indicating the reflector to start the working mode; and
   communicating with the access network device on the communication resource with assistance of the reflector when the reflector starts the working mode, wherein the communication resource is determined based on second indication information sent by a terminal device or the access network device.

6. The method according to claim 5, wherein sending the first indication information comprises:
   sending, to the reflector, the first indication information when determining that at least one trigger condition for starting the working mode is met, wherein the at least one trigger condition for starting the working mode comprises at least one of the following:
   measured signal quality of a downlink signal sent by the access network device is less than a first signal quality threshold;
   a specified downlink signal is received; or
   quality of service of a currently executed service does not meet a first specified service requirement.

7. The method according to claim 5, wherein sending the first indication information comprises:
   sending, to the reflector, the first indication information on a physical random access channel resource associated with a specified downlink signal.

8. The method according to claim 6, wherein the second indication information further comprises at least one of a reflection state matrix index, a working frequency of the reflector, or an identifier of the reflector.

9. The method according to claim 6, the method further comprising:
   sending, to the reflector, third indication information indicating the reflector to start a sleep mode when determining that at least one trigger condition for starting the sleep mode is met,
   wherein the at least one trigger condition for starting the sleep mode comprises at least one of the following:
   the measured signal quality of the downlink signal sent by the access network device is greater than a second signal quality threshold; or
   the quality of service of the currently executed service meets a second specified service requirement.

10. A communication method, comprising:
    receiving a first request message from a terminal device, wherein the first request message requests to enable a reflection surface-assisted communication;

sending, to a reflector, a first indication indicating the reflector to start a working mode;

sending, to the reflector, reflector scheduling information that comprises a communication resource occupied by the reflector in the working mode; and receiving a reflected signal sent by the reflector on the communication resource.

11. The method according to claim 10, the method further comprising:

receiving a second request message from the terminal device, wherein the second request message requests to stop the reflection surface-assisted communication; and sending, to the reflector, a second indication indicating the reflector to start a sleep mode.

12. The method according to claim 10, wherein the reflector scheduling information further comprises at least one of a reflection state matrix index, a working frequency of the reflector, or an identifier of the reflector.

13. An apparatus, comprising:

a processor; and a non-transitory memory storing programing instructions that, when executed by the processor, cause the apparatus to perform operations including:

receiving first indication information indicating a reflector to start a working mode;

receiving second indication information indicating a communication resource occupied by the reflector in the working mode, the communication resource comprising at least one of a time domain resource, a frequency domain resource, or a code domain resource; and sending, to an access network device or a terminal device, a reflected signal on the communication resource.

14. The apparatus according to claim 13, wherein the sending the reflected signal on the communication resource comprises:

determining that the second indication information comprises a reflection state matrix index;

sending, to the access network device or the terminal device, the reflected signal on the communication resource based on the reflection state matrix index.

15. The apparatus of claim 13, the operations further including:

receiving third indication information indicating the reflector to start a sleep mode in which the reflector does not reflect a radio signal received from the access network device or the terminal device.

16. An apparatus, comprising:

a processor; and a non-transitory memory storing programing instructions that, when executed by the processor, cause the apparatus to perform operations including:

receiving, from an access network device, reflector scheduling information that comprises a communication resource occupied by a reflector in a working mode;

sending, to the reflector, first indication information indicating the reflector to start the working mode; and communicating with the access network device on the communication resource with assistance of the reflector when the reflector starts the working mode, wherein the communication resource is determined based on second indication information sent by a terminal device or the access network device.

17. The apparatus according to claim 16, wherein the second indication information further comprises a reflection state matrix index of the reflector.

18. An apparatus, comprising:

a processor; and a non-transitory memory storing programing instructions that, when executed by the processor, cause the apparatus to perform operations including:

receiving a first request message from a terminal device, wherein the first request message requests to enable a reflection surface-assisted communication;

sending, to a reflector, a first indication indicating the reflector to start a working mode;

sending, to the reflector, reflector scheduling information that comprises a communication resource occupied by the reflector in the working mode; and receiving a reflected signal sent by the reflector on the communication resource.

19. The apparatus according to claim 18, the operations further including:

receiving a second request message from the terminal device, wherein the second request message requests to stop the reflection surface-assisted communication; and sending, to the reflector, a second indication indicating the reflector to start a sleep mode.

20. The apparatus according to claim 19, wherein the reflector scheduling information further comprises a reflection state matrix index of the reflector.

* * * * *